Nov. 7, 1939. C. E. LUCKE Re. 21,257

HEAT EXCHANGER

Original Filed May 26, 1931 4 Sheets-Sheet 1

INVENTOR
CHARLES E. LUCKE
BY Benj. R. Newcomb
ATTORNEY

Nov. 7, 1939. C. E. LUCKE Re. 21,257

HEAT EXCHANGER

Original Filed May 26, 1931 4 Sheets-Sheet 2

INVENTOR
CHARLES E. LUCKE
BY Benj. R. Stevens
ATTORNEY

Nov. 7, 1939. C. E. LUCKE Re. 21,257
HEAT EXCHANGER
Original Filed May 26, 1931 4 Sheets-Sheet 3
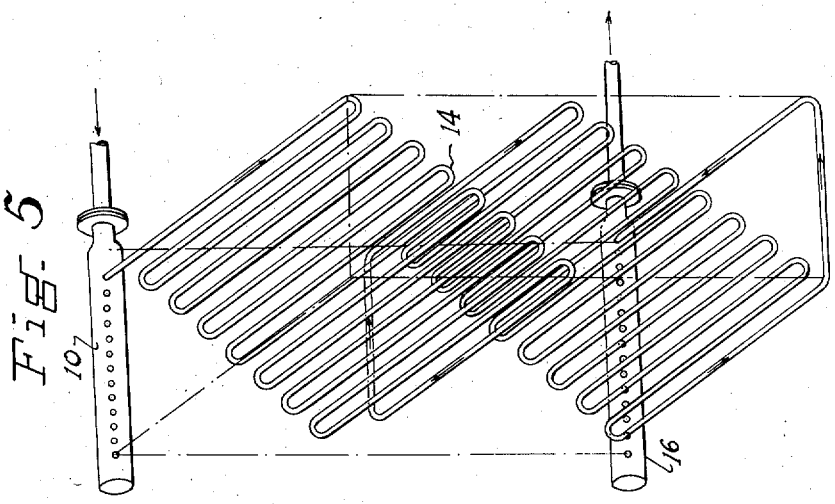
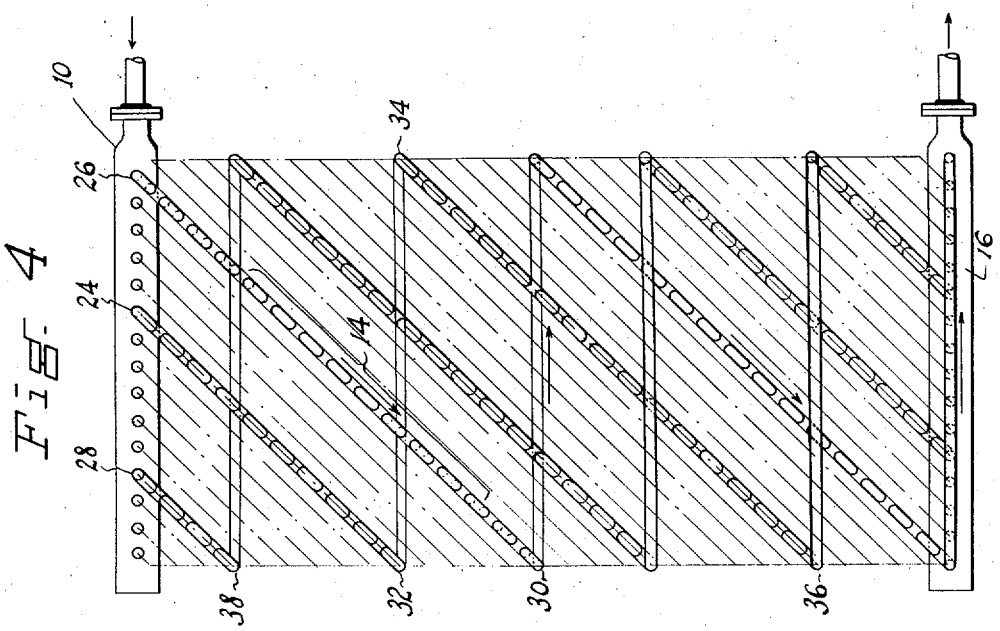
INVENTOR
CHARLES E. LUCKE
BY Benj. R. Newcomb
ATTORNEY Nov. 7, 1939. C. E. LUCKE Re. 21,257

HEAT EXCHANGER

Original Filed May 26, 1931 4 Sheets-Sheet 4

INVENTOR
CHARLES E. LUCKE
BY Benj. R. Newcomb
ATTORNEY

Reissued Nov. 7, 1939

Re. 21,257

UNITED STATES PATENT OFFICE 21,257

HEAT EXCHANGER

Charles E. Lucke, New York, N. Y., assignor to The Babcock & Wilcox Company, Bayonne, N. J., a corporation of New Jersey Original No. 2,075,044, dated March 30, 1937, Serial No. 540,025, May 26, 1931. Application for reissue September 8, 1938, Serial No. 228,982

26 Claims. (Cl. 257—230)

This invention is concerned with fluid heat exchange apparatus.

In the operation of economizers difficulties have been experienced in regard to the irregularities of results. In one part of the apparatus the contained fluid would be heated to the proper temperature, while in other parts there would be such excessively high temperatures that steam would be produced and collected. When this condition has prevailed in various parts of the apparatus, undesirable fluid actions have taken place. These actions not only interfere with the economical operation of the steam generator fed by the economizer, but they are apt to be destructive to the economizer structure. It is an object of this invention to overcome such difficulties.

More specifically, it is an object of the invention to provide for uniformity of operation of such fluid heat exchange apparatus as an economizer by causing all of the separate and contained fluid streams to be affected by all parts of the current of fluid acting upon the contained stream.

A general object of the invention is to attain equalization of heating in economizers which discharge separate streams of heated fluid. The invention provides for the uniformity of conditions of such separate streams.

It is also an object of the invention to provide a fluid heat exchange apparatus of the type mentioned with structures enabling the apparatus to be operated in accordance with different conditions of the current of fluid operating upon the contained streams. For example, when there is marked laning of the fluid current, the parts of the current at extreme temperatures may be eliminated from the operation.

Further objects of the invention will appear as the accompanying description proceeds.

The invention will be described with reference to the accompanying drawings in which:

Fig. 4 is a diagrammatic view somewhat similar to Fig. 3 but disclosing particularly the path of one of the contained streams of fluid in the apparatus.

Fig. 5 is an isometric view showing the coils for conducting the particular contained fluid stream indicated in Fig. 4.

Figure 1:
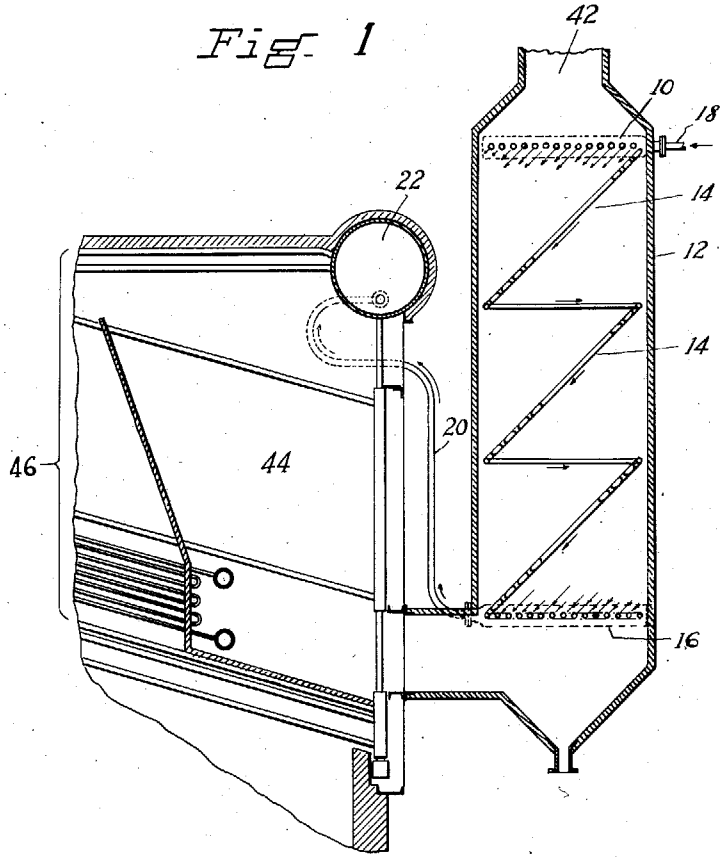
Fig. 1 is a diagrammatic representation of a downflow economizer associated with a steam boiler.

In the use of economizers the defect of unequalized heating may result from one or both of two causes. The first of these causes relates to unequalized water flow across the entire flow of water through the economizer when the gas flow is uniform, the second cause relates to the non-uniformity of gas flow as it contacts with the separate streams of water passing through the economizer. This non-uniformity may relate to mass flow or to the temperature of the fluid in movement, and the illustrative structures are designed to eliminate such defects.

Non-uniformity of gas flow in economizers is accentuated in large installations and it is likely to attain its maximum when the gas velocity is low. Under such conditions there may be such extreme non-uniformity that on one side of the gas flow chamber there is a falling gas current and on the other side there is a rising gas current. This is an extreme condition but is illustrative of conditions which are corrected by the illustrative equipment.

In the type of economizer shown in the drawings, the uniformity of distribution of heating gases is best at high velocity.

Fig. 1 discloses an economizer having a water inlet header 10 at the top of a flue 12. Water flows from the header 10 through flat coils 14 arranged to zig-zag across the flue. At the bottom of the flue these coils discharge into an outlet header 16. As shown these flat, obliquely arranged coils are connected together by horizontal pipes into a group which connects the inlet and outlet headers. Each coil is formed of straight sections of pipe connected by return bends to form zigzag flat coils.

Feed water enters the header 10 through an inlet 18 and is preferably forced through the economizer under pressure. After proceeding through the coils it flows through the outlet connection 20 to the steam and water drum 22 of the associated boiler construction.

Figs. 4 and 5 indicate a coil construction and arrangement of tubes for conducting the contained stream of water through and across the current of furnace gases moving upwardly through the flue 12. Each coil consists of a series of straight tube sections connected by return bends. As indicated, the inlet header 10 is formed with a row of ports or tube seats some of which are indicated at 24, 26 and 28. The upper coil 14 leads from the tube seat 26 and extends obliquely across the flue to a position indicated at 30. A similar but shorter coil will be understood to lead from the tube seat 24 to a position 32 at one side of the flue. From that point its contained fluid stream flows preferably horizontally across the flue to a position indicated at 34, whence it proceeds through another fluid coil to the position indicated at 36.

Starting from the tube seat 28 a much shorter fluid coil leads obliquely to a point at one side of the economizer indicated at 38. From that point its contained fluid stream passes through a horizontal pipe to the right where it enters the upper end of another coil and then flows in zig-zag manner back and forth across the flue similarly to the movement of the contained streams in the other coils.

Successive sections of the fluid coils conduct the water across the flue at successively different levels. Each section is also located in a different vertical part of the gas stream to the end that each stream of contained fluid flows through every cross-sectional part of the gas stream. The location of corresponding tubes of adjacent coils in offset relationship further promotes equalization of the heat transfer to the contained fluid.

In the structure indicated in Fig. 1, furnace gases flow upward through the flue 12 and out the stack 42. The gases proceed into the lower part of the flue from the last pass 44 of the boiler section 46.

Figure 2:
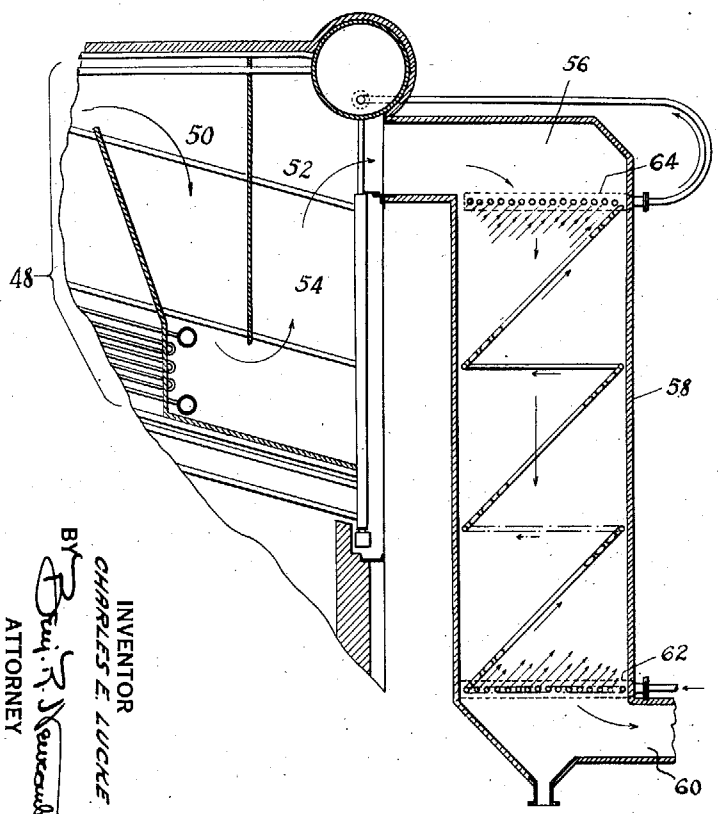
Fig. 2 is a diagrammatic view in the nature of a vertical section showing an upflow economizer operating with a steam boiler.

The apparatus indicated in Fig. 2 includes a boiler section 48 into which the furnace gases proceed as indicated by the arrows 50 and 52. From the last gas pass 54 the furnace gases pass into the inlet 56 of the economizer flue 58. They are discharged from the bottom of the economizer through the conduit 60. In this modification also, the contained streams of fluid to be heated pass in a direction the reverse of the direction of the movement of the furnace gas. The fluid passes from the inlet header 62 through groups of zig-zag coils to the outlet header 64.

Figure 3:
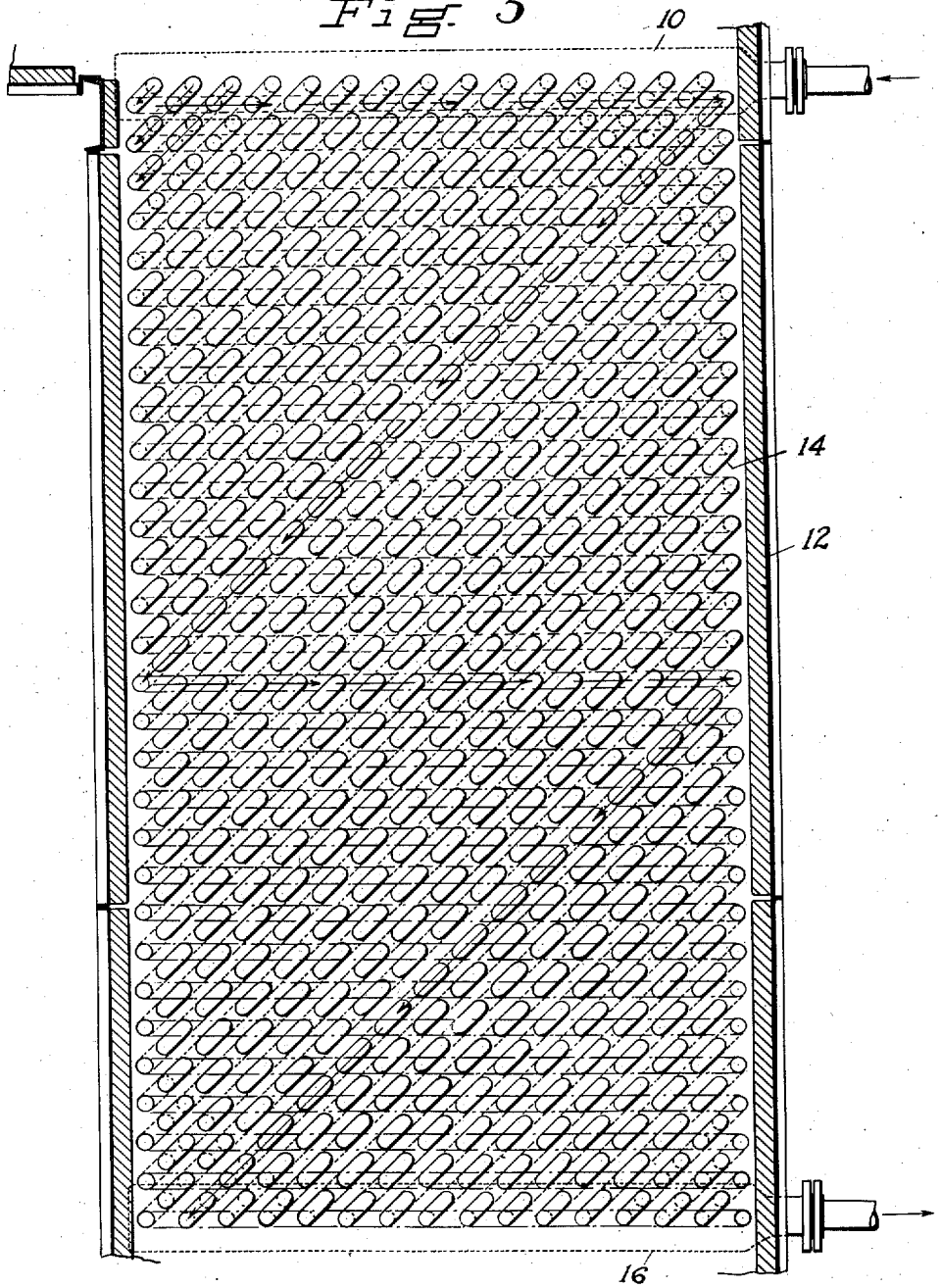
Fig. 3 is an end view of the illustrative apparatus showing the casing end removed so as to expose the return bends of the economizer coils.

Fig. 3 indicates the arrangement of return bends at the ends of the independent tubes in the economizer. The zig-zag path of one stream of fluid is indicated by arrows extending from the inlet header to the outlet header. Each separate stream of fluid moves through a similar path.

In considering the operation of the structures shown in Figs. 4 and 5 it is to be noted that an inequality of heating conditions across the apparatus is corrected. Thus, unequal gas flow or variant temperature conditions do not interfere with equalized heating.

Figure 6:
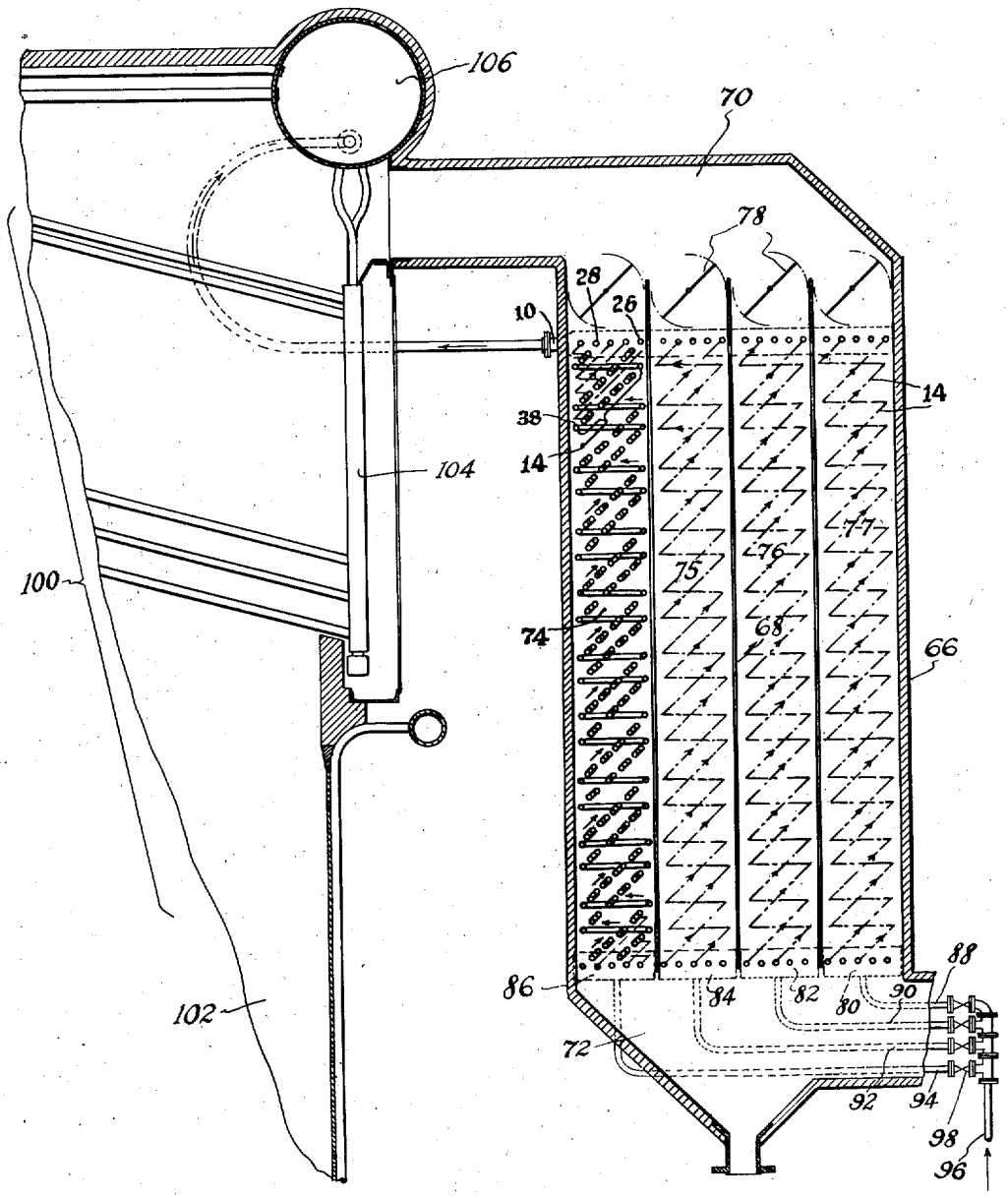
Fig. 6 is a diagrammatic view in the nature of a vertical section through an economizer with fluid flow controls for controlling and limiting the passage of the heating medium through an upflow economizer.

In Fig. 6 there is shown a counter-flow economizer in which the flow of the heating medium is controllable as to volume and cross-section at the will of the attendant. The flue 66 is divided by partitions 68 extending from the gas inlet 70 to the gas outlet 72. Separated gas passages 74, 75, 76 and 77 are thus provided.

At the inlet end of the separated gas passages dampers 78 are located. The independent operation of these dampers permits the control of heat transfer in one or more of the passages 74, 75, 76 and 77 as the conditions of operation demand. The flow of the heating medium may be thereby controlled so as to correspond to the load conditions under which the system is operating. The laning of the heating gases in the economizer may be thus counteracted. If, for example, with all of the dampers in open position, the gases flowing through the passage 77 are of exceedingly high temperature, that passage may be closed and the gases divided among the remaining passages.

Selective distribution of the fluid to be heated renders the illustrative apparatus more adaptable to the different operating conditions to be met. The provision of separate inlet headers 80, 82, 84 and 86 permits of such distribution. Preferably these headers have separate connections 88, 90, 92 and 94 connecting with the fluid inlet 96. Selective flow of the fluid from the inlet 96 to the separate headers depends upon the conditions of the valves 98, it being understood that there is a separate valve for each of the connections 88, 90, 92 and 94.

Different temperature and flow conditions in the economizer are controlled by suitable setting of the various fluid control devices above described. Thus, by appropriate setting of these devices such actions as "water hammer" and actions causing a "steam bound" condition may be prevented. Extreme flexibility and adaptability of operation of the economizer is thus provided.

Arrangement of the tubes in passages 74, 75, 76 and 77 in such a zig-zag manner as indicated in Figs. 1, 2, 4 and 5 further promotes uniformity of results and increases the effectiveness of the illustrative apparatus.

The device illustrated in Fig. 6 of the drawings is capable of producing a gas velocity which is independent of any one of the following:

1. Boiler load.
2. Velocity of the gas on entry to the economizer casing.
3. Velocity of the gas leaving the economizer casing.
4. Total weight of the gas passing through the economizer.

The structure illustrated in Fig. 6 includes the boiler 100 associated with a furnace 102. Above the furnace is a water tube boiler section 104 with a superposed steam and water drum 106.

While this invention has been described with reference to the particular structures shown in the drawings, it is to be understood that it is not limited thereto, but is of a scope commensurate with the scope of the sub-joined claims.

What is claimed is:

1. An economizer comprising, in combination, walls forming a passage for the flow of a stream of heating gases, an inlet header extending transversely of the passage, a similarly positioned outlet header, and return bend coils of tubing formed of aligned sections extending back and forth across the passage so that every cross-sectional part of the stream of heating medium contacts with a coil section, said coils conducting water from the inlet header to the outlet header with a flow which is counter-current with respect to the flow of heating gases.

2. An economizer comprising, in combination, a casing defining a passage for the flow of heating gases, a water inlet header arranged transversely of the casing, groups of successive tubes displaced vertically and horizontally with respect to the longitudinal axis of the passage and forming flat coils extending across the gas stream, connections between the tubes of each group, means for conducting the stream of water from The discharge end of each of the coils so formed to the opposite wall of the passage, from which position a similar second coil receives the stream of water discharging from a first coil and conducts it in similar manner again across the passage, an outlet header extending transversely of the passage, and means connecting the discharge end of each of the series of coils to the outlet headers.

3. In a steam supply system having a steam generating section over which heating gases pass to an economizer; the economizer comprising, a water inlet chamber, an outlet chamber, a heating gas flue construction housing groups of return bend water conducting tubes each transmitting water in a separate and independent stream from the inlet chamber through the flue construction to the outlet chamber with the tubes of each group arranged in zig-zag formation and each group containing a plurality of oblique coils connected in a zig-zag arrangement, and means for conducting heating gases to the flue construction so that they pass therethrough in a direction counter-current to the flow of water.

4. An economizer comprising, in combination, a casing constituting a flue for the passage of heating gases, a water outlet header extending transversely of the flue, tubes for conducting water in separated streams through the flue to the outlet header, partitions extending through the flue and between the tubes to divide the flue into a plurality of separated gas passages, means at the end of each of said passages for controlling and preventing the movement of heating gases through the passage, a separate water inlet header for each passage, a feed water inlet main, separate conduits leading from said main to the separate inlet headers, and separate valves for selectively establishing communication between said main and said conduits.

5. An economizer comprising, in combination, a casing forming a flue for the passage of a heating gas therethrough, tubes conducting water through the flue, means for forming a plurality of longitudinal zones in the flue, means for varying the volume of heating gases passing through each of said zones, and means for controlling the inflow of water to said zones, so that the flow to one zone can be varied independently of the flow to any of the other zones.

6. Fluid heat exchange apparatus comprising, in combination, a casing having partitions forming a plurality of parallel passages for the flow of a heating medium, means for conducting a separate group of contained fluid streams in a zigzag path through each passage, separated means for supplying fluid to the separate groups, and means for regulating the flow of heating medium through any passage independently of the flow conditions in the other passages.

7. In an economizer; walls forming a passage for the flow of a stream of heating gases, a row of water inlets extending transversely of the passage, a similarly positioned row of outlets, groups of spaced return bend coils of tubing connected in series with each coil formed of aligned sections and the sections of each coil extending back and forth across the passage so that every cross-sectional part of the stream of heating medium contacts with the tubes of the individual groups, and means for connecting each group to an inlet and an outlet, said groups conducting water from the inlets to the outlets with a flow which is counter-current with respect to the flow of heating gases.

8. In an economizer, a flue constituting a gas pass, and water conducting conduit coils proceeding obliquely of the gas pass flue from positions spaced transversely of the flue to compensate for non-uniform gas distribution or velocity in the flue and to provide for uniform heating of the fluid passing through the various coils.

9. In fluid heat exchange apparatus, a flue longitudinally of which a heating fluid flows in a single pass, means for conducting a fluid to be heated through the flue in parallel flow circuits of equal lengths between inlets and outlets, each circuit comprising serially connected flat coils of return bend tubes arranged obliquely to the longitudinal axis of the flue, the first coil of each circuit being of a length different from the lengths of the first coils of adjacent circuits.

10. In fluid heat exchange apparatus, walls forming a passage directing a heating fluid, and groups of tubes connected in series to conduct contained streams of a heat absorbing fluid through the passage in parallel and independent flow circuits, said groups of connected tubes including some which extend between opposite wall portions of the passage and conduct their confined fluid streams back and forth transversely of the passage toward and from said wall portions.

11. In an economizer, a flue for the passage of furnace gases, tubes conveying separate streams of fluid through the flue, and tube connections whereby each stream of contained fluid flows recurrently and obliquely entirely across the flue and simultaneously generally in a direction counter to the flow of furnace gases.

12. In fluid heat exchanges apparatus, a flue for the passage of heating gases, tubes providing for the flow of a plurality of independent streams of fluid through the flue and transversely of the heating gases, and connections between the tubes forming independent fluid flow circuits, individual and successive tubes in the independent flow circuits being displaced longitudinally of the gas flow and transversely of the flue whereby the flow of each circuit is subjected to the heat of the gas in every cross-sectional flow area of the flue.

13. In an economizer, a flue, means providing for a flow of heating gases through the flue, tubes providing for the flow of a plurality of independent streams of fluid through the heating gases in the flue, and means for connecting the tubes to cause said streams to flow back and forth transversely of the flue and between two opposite sides of the flue and to cause said streams to simultaneously flow recurrently transversely of the flue between two other opposite sides of the flue.

14. In an economizer, a flue for the passage of furnace gases, tubes conveying separate streams of fluid through the flue, and tube connections whereby each stream of contained fluid flows recurrently obliquely entirely across the flue and in a direction counter to the flow of furnace gases.

15. In apparatus of the type wherein an economizer and boiler are connected for fluid flow, an economizer gas flue or casing affording a heating gas passage, tubes for conducting a fluid through the passage, and means for connecting the tubes so that they form separate fluid flow paths each consisting of a plurality of spaced flat coils of return bend sections extending obliquely of the longitudinal flow axis of the economizer.

16. In an economizer for heating boiler feed water, a flue for furnace gases, tubes conducting water through the flue in separate streams, means connecting the tubes so that they form successive flat coils of return bend sections extending obliquely to the longitudinal flow axis of the flue, and a gas flow restrictor for varying the velocity of the gases through the flue independently of the velocity of the gases as they pass to the inlet of the flue.

17. In fluid heat exchange apparatus, a flue, means providing a plurality of passages in the flue for separate streams of heating medium in longitudinal zones in the flue, means for conducting separate and independent streams of fluid across the flue so that each stream crosses every cross-sectional part of a stream of heating medium, and means for selectively diminishing at will the flow of heating medium through separate longitudinal zones of the flue.

18. In an economizer, an inlet chamber for heating gases; an outlet chamber for said gases; walls forming a large main gas flue connecting said chambers; a row of inlets at one end of the flue for a fluid to be heated; a row of fluid outlets at the other end of the flue; tubes connecting opposite inlets and outlets to provide separate fluid flow paths through the flue; and means for compensating for the nonuniformity of heating throughout the flue; said last named means comprising walls dividing said flue longitudinally into a plurality of separate and parallel heating gas passages, and independently operable means regulating the flow of heating gases through the passages, there being separate fluid flow paths for the separate passages through which flow in the same direction contained streams of a fluid to be heated.

19. In an economizer, an inlet chamber for heating gases; an outlet chamber for said gases; walls forming a large main gas flue connecting said chambers; a row of inlets at one end of the flue for a fluid to be heated; a row of fluid outlets at the other end of the flue; tubes connecting opposite inlets and outlets to provide separate fluid flow paths through the flue; and means for compensating for the non-uniformity of heating throughout the flue; said last named means comprising walls dividing said flue longitudinally into a plurality of separate and parallel heating gas passages, independently operable means regulating the flow of heating gases through the passages, and separate fluid inlet headers, corresponding in number to the number of said passages, there being separate fluid flow paths for the separate passages through which flow in the same direction contained streams of a fluid to be heated.

20. In an auxiliary fluid heater arranged to receive waste heating gases from an associated steam boiler, fluid heating surface arranged to receive the heating gases in heat transfer contact therewith, and means for varying the amount of said heating surface contacted by said heating gases while maintaining all of the heating gases received by said fluid heater in heat transfer contact with at least a portion of said heating surface, whereby heating conditions in said fluid heater are controllable and corrosion of said heating surface may be minimized.

21. In an economizer arranged to receive waste heating gases from an associated steam boiler, water heating surface arranged to receive the heating gases in heat transfer contact therewith, and means for varying the amounts of heating gases contacting with different portions of said heating surface while maintaining all of the heating gases received by said fluid heater in heat transfer contact with at least a portion of said heating surface, whereby heating conditions in said economizer are controllable and corrosion of said heating surface may be minimized.

22. In an auxiliary fluid heater arranged to receive waste heating gases from an associated steam boiler, fluid heating surface divided into a plurality of separate flow sections arranged to receive the heating gases in heat transfer contact therewith, and means for varying the amounts of heating gases contacting with different sections of said heating surface while maintaining all of the heating gases received by said fluid heater in heat transfer contact with at least one section of said heating surface, whereby heating conditions in said fluid heater are controllable and corrosion of said heating surface may be minimized.

23. In an auxiliary fluid heater arranged to receive waste heating gases from an associated steam boiler, a casing arranged to receive the heating gases, wall means dividing said casing into a plurality of separate parallel flow heating gas passes, a fluid heating surface section arranged in each of said gas passes, and means for varying the number of said gas passes having a heating gas flow therethrough, whereby heating conditions in said fluid heater are controllable and corrosion of said heating surface may be minimized.

24. In a fluid heater, means forming a gas pass for the flow of furnace gases therethrough a first set of flat coils including parallel tubular sections extending transversely of the flow of the furnace gases, other sets of flat coils likewise including parallel tubular sections extending transversely of the gas flow in succeeding positions in the gas pass, and a common source of fluid connected to said coils for flow therethrough to a common outlet, the coils being so connected as to form flow paths in parallel arrangement between the source of fluid and the common outlet, each coil of one set having its outlet end directly communicating with the inlet end of a coil of a succeeding set by a laterally extending connection, the directly connected coils having their connected ends offset laterally with reference to the direction of gas flow.

25. In fluid heat exchange apparatus for attaining heat exchange equalization of separate fluid streams flowing in parallel arrangement through a fluid heat exchange medium flow of non-uniform heat exchange value over its section, means forming a fluid heat exchange pass, a set of spaced convection heat exchange tubes disposed across said pass from side to side and disposed across the flow of fluid heat exchange medium in one transversely extending zone of said pass, a second set of spaced convection heat exchange tubes similarly disposed across the pass and across the flow of the heat exchange medium in another transversely extending zone of different temperature, a laterally extending connection between the outlet end of each tube of one set and the inlet end of a tube of the other set positioned at a greater distance from one side of said pass, the connected tubes forming parts of fluid flow paths arranged in parallel for the flow of fluid from a fluid source to a fluid outlet, and means associated with the flow paths to cause the fluid to flow through successive tubes and through successive zones of the heat exchange medium of temperatures varying simultaneously with the temperature changes of the fluid in the successive tubes.

26. In a fluid heater, means forming a fluid heating pass receiving a heating medium which so enters the heating pass and proceeds therethrough that there may be non-uniform temperatures in different zones transversely of the gas pass, spaced tube sections extending through the heating pass and conducting a fluid to be heated, said tube sections arranged in an assembly extending entirely across the heating pass, and means so connected to said tube sections that they provide fluid flow paths leading in parallel from a common inlet to a common outlet, said means including in each flow path a connection extending laterally of the gas pass from one tube section in a high temperature zone to a second and successive tube section in a lower temperature zone and at a different distance from the same side of the heating pass, whereby the heating effect is equalized in spite of non-uniform temperature conditions of the heating medium.

CHARLES E. LUCKE.